United States Patent
Shi et al.

(10) Patent No.: US 12,100,968 B2
(45) Date of Patent: Sep. 24, 2024

(54) WIRELESS POWER MODE SWITCHING

(71) Applicant: Apple Inc., Cupertino, CA (US)

(72) Inventors: Lixin Shi, Redwood City, CA (US); Weihong Qiu, San Ramon, CA (US); Zelin Xu, San Jose, CA (US); Zaki Moussaoui, San Carlos, CA (US); Matthew J. Chabalko, Salinas, CA (US)

(73) Assignee: Apple Inc., Cupertino, CA (US)

( * ) Notice: Subject to any disclaimer, the term of this patent is extended or adjusted under 35 U.S.C. 154(b) by 503 days.

(21) Appl. No.: 17/513,581

(22) Filed: Oct. 28, 2021

(65) Prior Publication Data
US 2023/0059432 A1 Feb. 23, 2023

Related U.S. Application Data

(60) Provisional application No. 63/236,084, filed on Aug. 23, 2021.

(51) Int. Cl.
*H02J 50/12* (2016.01)
*H02J 50/40* (2016.01)
(Continued)

(52) U.S. Cl.
CPC .............. *H02J 50/12* (2016.02); *H02J 50/40* (2016.02); *H02J 50/80* (2016.02); *H02J 50/90* (2016.02); *H02J 50/60* (2016.02)

(58) Field of Classification Search
None
See application file for complete search history.

(56) References Cited

U.S. PATENT DOCUMENTS 9,553,473 B2  1/2017  Zeine et al.
9,602,163 B2  3/2017  Schultz et al.
(Continued)

FOREIGN PATENT DOCUMENTS

EP     3832847 A1    6/2021

OTHER PUBLICATIONS

U.S. Appl. No. 17/179,603, filed Feb. 19, 2021.
U.S. Appl. No. 17/100,317, filed Nov. 20, 2020.

*Primary Examiner* — Richard Isla
*Assistant Examiner* — Sadia Kousar
(74) *Attorney, Agent, or Firm* — Treyz Law Group, P.C.; Joseph F. Guihan

(57) ABSTRACT

An electronic device (that is capable of both transmitting and receiving wireless power) may be physically and inductively coupled to a removable accessory (that only receives wireless power). The electronic device and removable accessory may optionally be placed on a power transmitting device. In response to the electronic device and removable accessory being placed on a wireless power transmitting device, the electronic device may switch from a power transmitting mode (in which the electronic device transmits wireless power to the removable accessory) to a power receiving mode (in which the electronic device receives wireless power from the wireless power transmitting device). To ensure the electronic device detects the wireless power transmitting device and switches to the power receiving mode in this scenario, the electronic device may transmit wireless power in bursts separated by sleep periods while in the power transmitting mode.

20 Claims, 10 Drawing Sheets

(51) Int. Cl.
*H02J 50/80* (2016.01)
*H02J 50/90* (2016.01)
*H02J 50/60* (2016.01)

(56) References Cited

U.S. PATENT DOCUMENTS

| | | |
|---|---|---|
| 10,938,251 B1 | 3/2021 | Mehrabi et al. |
| 2015/0115727 A1 | 4/2015 | Carobolante et al. |
| 2015/0137749 A1* | 5/2015 | Park .................. H02J 50/12 320/108 |
| 2015/0249484 A1* | 9/2015 | Mach .................. H02J 50/10 307/104 |
| 2016/0094078 A1 | 3/2016 | Graham et al. |
| 2017/0170678 A1* | 6/2017 | Uhm .................. H02J 50/70 |
| 2020/0076239 A1 | 3/2020 | Taniguchi et al. |

\* cited by examiner

WIRELESS POWER MODE SWITCHING

This application claims the benefit of provisional patent application No. 63/236,084, filed Aug. 23, 2021, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat transmits wireless power to a wireless power receiving device such as a portable electronic device. The wireless power receiving device has a coil and rectifier circuitry. The coil receives alternating-current wireless power signals from the wireless charging mat. The rectifier circuitry converts the received signals into direct-current power.

SUMMARY

A wireless power system may include one or more wireless power transmitting devices, one or more wireless power receiving devices, and one or more wireless power transmitting and receiving devices. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power. The wireless power transmitting and receiving device may include at least one coil and both wireless power transmitting circuitry and wireless power receiving circuitry.

An electronic device (that is capable of both transmitting and receiving wireless power) may be physically and inductively coupled to a removable accessory (that only receives wireless power). The removable accessory may have a wireless charging coil that is configured to receive wireless power from the electronic device when the removable accessory is coupled to the electronic device. The electronic device and removable accessory may optionally be placed on a power transmitting device.

In response to the electronic device and (attached) removable accessory being placed on a wireless power transmitting device, the electronic device may switch from a power transmitting mode (in which the electronic device transmits wireless power to the removable accessory) to a power receiving mode (in which the electronic device receives wireless power from the wireless power transmitting device). To ensure the electronic device detects the wireless power transmitting device and switches to the power receiving mode in this scenario, the electronic device may transmit wireless power in bursts separated by sleep periods while in the power transmitting mode. While the electronic device and (attached) removable accessory are on the wireless power transmitting device, the removable accessory may siphon some of the wireless power transmitted by the wireless power transmitting device to the electronic device.

DETAILED DESCRIPTION

A wireless power system may include one or more electronic devices that transmit wireless power, one or more electronic devices that receive wireless power, and one or more electronic devices that both transmit and receive wireless power. The wireless power transmitting device may be a wireless charging mat or wireless charging puck, as examples. The wireless power receiving device may be a device such as a wristwatch, cellular telephone, tablet computer, laptop computer, an accessory such as a case, or other electronic equipment, as examples. The wireless power transmitting and receiving device may be an electronic device case (e.g., a case for a cellular telephone), cellular telephone, tablet computer, laptop computer, or other electronic equipment. The wireless power transmitting device may wirelessly transmit power to a wireless power receiving device. The wireless power receiving device uses power from the wireless power transmitting device for powering the device and for charging an internal battery.

In one illustrative configuration, an electronic device such as a cellular telephone may be configured to both receive and transmit wireless power. The cellular telephone may be operable with an accessory device that is configured to receive wireless power. The cellular telephone may optionally mate with the accessory device. When the cellular telephone is mated with the accessory device, the cellular telephone may transfer wireless power to the accessory device. When the cellular telephone and the mated accessory device are placed on a power transmitting device such as a charging puck, the cellular telephone may switch from a power transmitting mode to a power receiving mode and receive wireless power from the charging puck. The accessory device may siphon some of the power transmitted by the charging puck in this configuration.

Figure 1:
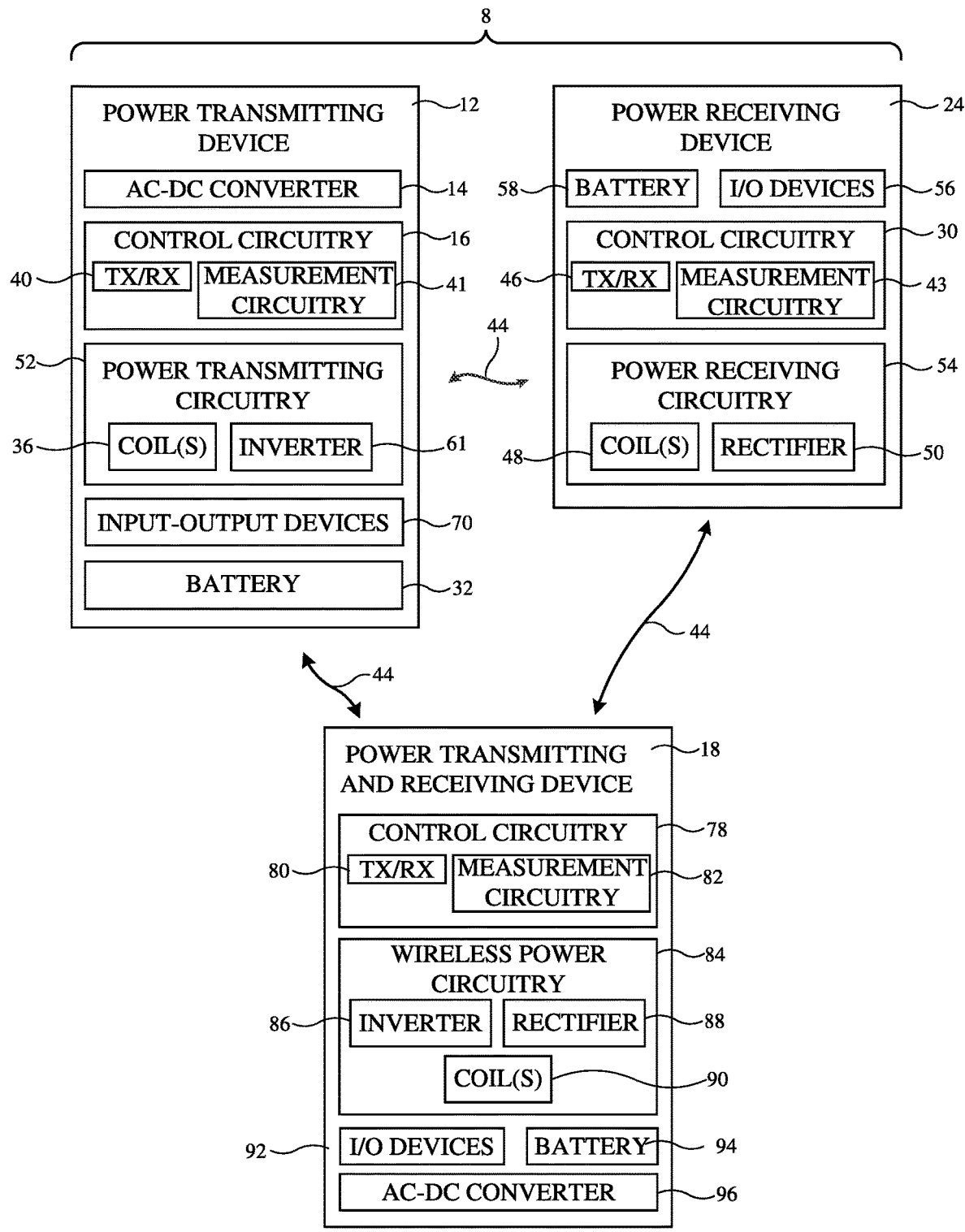
FIG. 1 is a schematic diagram of an illustrative wireless power system in accordance with an embodiment.

An illustrative wireless power system (wireless charging system) is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power (either simultaneously or at separate times) such as wireless power transmitting and receiving device 18. It should be understood that one or more of each type of device may be present in the wireless power system at any given time, with devices being added and removed from the system in a fluid manner. Additionally, one or more devices may switch between tethered (where the device receives power from a wall outlet or other power source) and untethered (where the device battery is used to power the device) states. The function of power transmitting and receiving device 18 may change depending upon the arrangement of the system at a given time. A power transmitting and receiving device may only transmit power in some scenarios, may only receive power in some scenarios, and may both transmit and receive power in some scenarios. A power transmitting device 12 may transmit power directly to a power receiving device 24 in some scenarios. In other scenarios, power transmitting device 12 may transmit power to a power transmitting and receiving device 18, which then transmits the power to power receiving device 24. The functionality of each device and inductive coupling between each device within the system may be updated as devices are added to and removed from the system.

Wireless power transmitting device 12 includes control circuitry 16. Wireless power receiving device 24 includes control circuitry 30. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is connected to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or puck are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be connected to a wall outlet (e.g., an alternating current power source), may have a battery 32 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. In other words, one or more of coils 36 is inductively coupled to one or more of coils 48. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24 (such as control circuitry 30, input-output devices 56, etc.). For example, device 24 may include input-output devices 56. Input-output devices 56 may include input devices for gathering user input and/or making environmental measurements and may include output devices for providing a user with output. As an example, input-output devices 56 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Device 12 may optionally have one or more input-output devices 70 (e.g., input devices and/or output devices of the type described in connection with input-output devices 56). Device 18 may optionally have one or more input-output devices 92 (e.g., input devices and/or output devices of the type described in connection with input-output devices 56).

The example in FIG. 1 of power receiving device 24 and power transmitting and receiving device 18 including batteries 58 and 94 respectively is merely illustrative. If desired, an electronic device may include a supercapacitor to store charge instead of a battery. For example, power receiving device 24 may include a supercapacitor in place of battery 58. Battery 58 may therefore sometimes be referred to as power storage device 58 or supercapacitor 58. Similarly, power transmitting and receiving device 18 may include a supercapacitor in place of battery 94. Battery 94 may therefore sometimes be referred to as power storage device 94 or supercapacitor 94.

Device 12, device 18, and/or device 24 may communicate wirelessly using in-band or out-of-band communications. In some examples, frequency-shift keying (FSK) and/or amplitude-shift keying (ASK) may be used to convey in-band data between devices 12, 18, and 24. Power may be conveyed wirelessly during these FSK and ASK transmissions. In some examples, device 12 has wireless transceiver circuitry 40 that wirelessly transmits out-of-band signals (e.g., to device 18 or device 24) using an antenna. Wireless transceiver circuitry 40 may be used to wirelessly receive out-of-band signals from device 18 or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90.

It is desirable for power transmitting device 12, power transmitting and receiving device 18, and power receiving device 24 to be able to communicate certain information such as received power to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The charging surface may be formed by a planer outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). Measurement circuitry 41 can also be used to make sensor measurements using a capacitive sensor, can be used to make temperature measurements, and/or can otherwise be used in gathering information indicative of whether a foreign object or other external object (e.g., device 18 or 24) is present on device 12.

Power transmitting and receiving device 18 may be a wireless charging mat or puck that is connected to a power adapter (e.g., an AC to USB power adapter) or other equipment by a cable, may be equipment that has been incorporated into furniture, a vehicle, or other system, may be a removable battery case, may be a portable electronic device such as a wristwatch, a cellular telephone, a laptop computer, a tablet computer, an accessory such as an earbud, or other electronic equipment. Power transmitting and receiving device 18 is capable of both transmitting and receiving wireless power. Power transmitting and receiving device 18 therefore may include power transmitting components, similar to power transmitting device 12. Power transmitting and receiving device 18 may also include power receiving components, similar to power receiving device 24.

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and out-of-band communications (using an antenna). Control circuitry 78 may also optionally include measurement circuitry 82 (e.g., measurement circuitry of the type described in connection with measurement circuitry 41).

Wireless power circuitry 84 in device 18 may include both an inverter 86 and a rectifier 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. For example, transmitting device 12 may transmit power to device 24 and device 18 (while device 18 does not separately transmit power to device 18). In another example, transmitting device 12 transmits power to device 18, which transmits power to 24 (without direct exchange of power from device 12 to device 24).

In some applications, power transmitting and receiving device 18 only transmits wireless power (e.g., using inverter 86 and coil(s) 90). In some applications, power transmitting and receiving device 18 only receives wireless power (e.g., using rectifier 88 and coil(s) 90). In some applications, power transmitting and receiving device simultaneously receives and transmits wireless power. When simultaneously receiving and transmitting wireless power, device 18 may optionally perform both the power transmitting and power receiving operations associated with inverter 86 and rectifier 88 (e.g., device 18 uses the rectifier to charge the battery and operate the device and independently uses the inverter to transmit a desired amount of power). Alternatively, device 18 may relay received wireless power signals without rectifying the power. Device 18 may include only one coil that is used for both wireless power transmission and wireless power reception. Alternatively, device 18 may have at least one dedicated wireless power transmitting coil and at least one dedicated wireless power receiving coil. Device 18 may have multiple coils that are all used for both wireless power transmission and wireless power reception. Different coils in device 18 may optionally be shorted together in different modes of operation.

Figure 2:
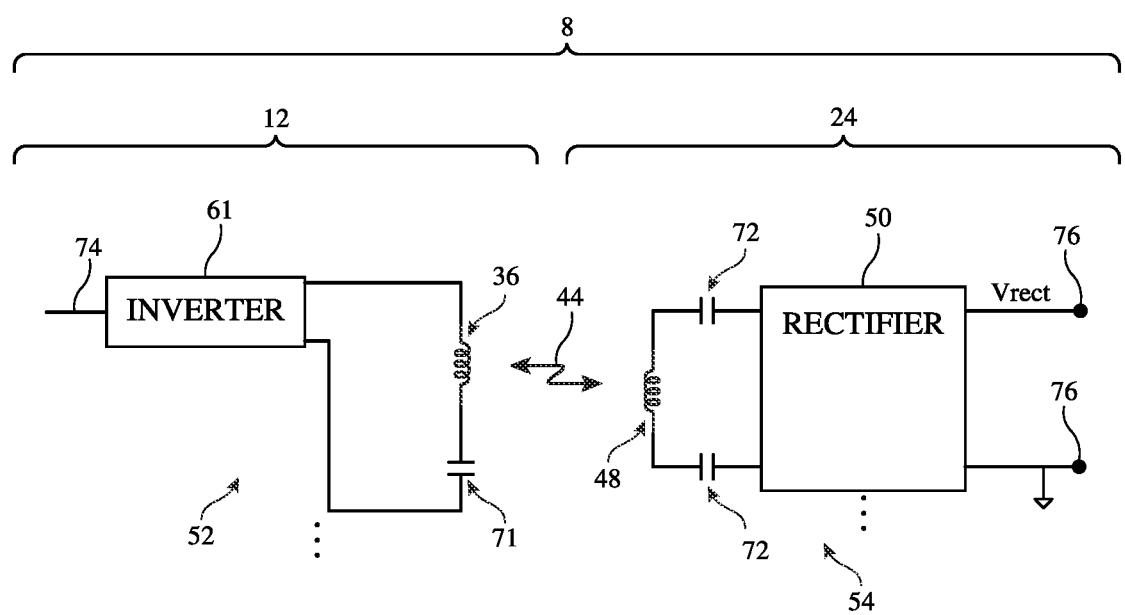
FIG. 2 is a circuit diagram of illustrative wireless power transmitting and receiving circuitry in accordance with an embodiment.

FIG. 2 is a circuit diagram of illustrative wireless charging circuitry for system 8. Wireless charging circuitry of a power transmitting device 12 and a power receiving device 24 is shown. However, it should be understood that device 18 may have the corresponding components for both power transmission and power reception and may be used in place of either device 12 and/or device 24 if desired. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 and converts received power from AC to DC and supplies a corresponding direct current output voltage Vrect across rectifier output terminals 76 for powering load circuitry in device 24 (e.g., for charging power storage device 58, for powering a display and/or other input-output devices 56, and/or for powering other components). A single coil 48 or multiple coils 48 may be included in device 24.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. In general, wireless power may simultaneously be conveyed between devices during in-band communications (using ASK or FSK).

The power transmission frequency used for transmission of wireless power may be, for example, a predetermined frequency of at least 80 kHz, at least 100 kHz, between 100 kHz and 205 kHz, less than 500 kHz, less than 300 kHz, between 100 kHz and 400 kHz, or other suitable wireless power frequency. In some configurations, the power transmission frequency may be negotiated in communications between devices 12 and 24. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power (e.g., even if the devices do not enter a dedicated power transfer phase).

At least one coil in power transmitting and receiving device 18 may be used for transmitting or receiving wireless power (depending on the conditions within the wireless charging system). However, the coil does not transmit and receive wireless power at the same time. Therefore, control circuitry within the device may be used to control whether the coil is used for transmitting or receiving wireless power at any given time.

Figure 3:
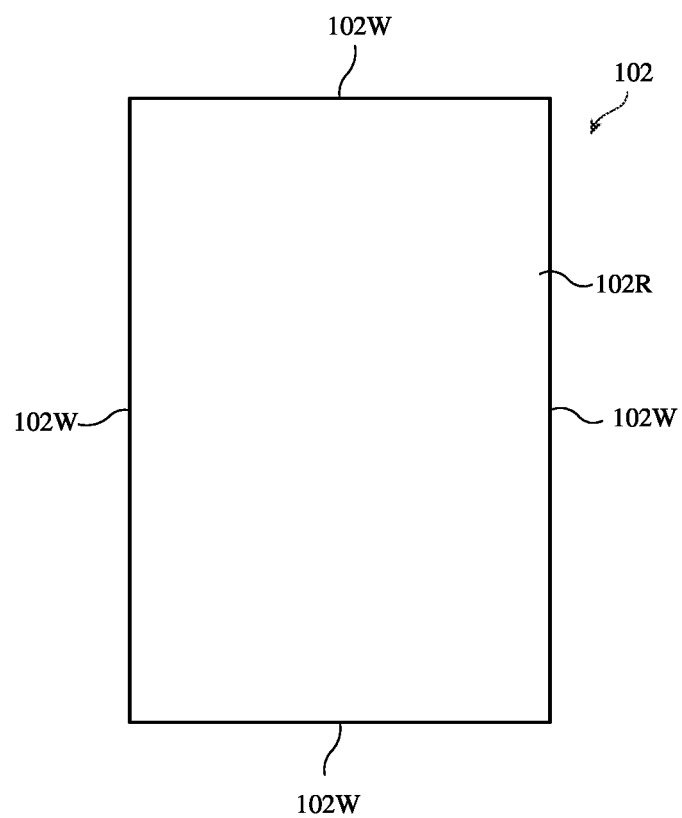
FIG. 3 is a top view of an illustrative removable accessory that may be included in a wireless power system in accordance with an embodiment.

A device in wireless charging system 8 may optionally be coupled (e.g., physically coupled) to a removable accessory such as a case. The case may optionally have wireless charging functionality (e.g., the case may be capable of receiving and/or transmitting wireless power). When the device is physically coupled to the removable accessory and the removable accessory has wireless charging functionality, the device and the removable accessory may also be inductively coupled. FIG. 3 is a top view of an accessory such as a removable case.

Removable accessory 102 (sometimes referred to as a removable case or removable cover) may have any suitable shape that allows case 102 to mate with another device. Accessory 102 and the device to which it is coupled may each serve as a power transmitting device, a power receiving device, or a power transmitting and receiving device. The device held by accessory 102 may be a portable electronic device such as a wristwatch, a cellular telephone, a laptop computer, a tablet computer, an accessory such as an earbud, or other electronic equipment.

In the example of FIG. 3, accessory 102 includes a rectangular recess with a wall 102R surrounded by peripheral sidewalls 102W and/or other suitable coupling structures (straps, clips, a sleeve, corner pockets, etc.) that allow accessory 102 to receive and couple to the additional device. Wall 102R may be positioned adjacent a rear face of the device when coupled to the device and therefore may sometimes be referred to as rear wall 102R. When it is desired to protect the additional device in accessory 102, the device (e.g., a housing of the device) may be press fit into a recess formed by the sidewalls 102W and/or rear wall 102R of accessory 102, coupled to accessory 102 using magnets, clips, or straps, or otherwise coupled to accessory 102. Accessory 102 may be formed from fabric, leather, polymer, other materials, and/or combinations of these materials. As previously mentioned, accessory 102 may in some embodiments include one or more coils that each transmit and/or receives wireless power.

Figure 4:
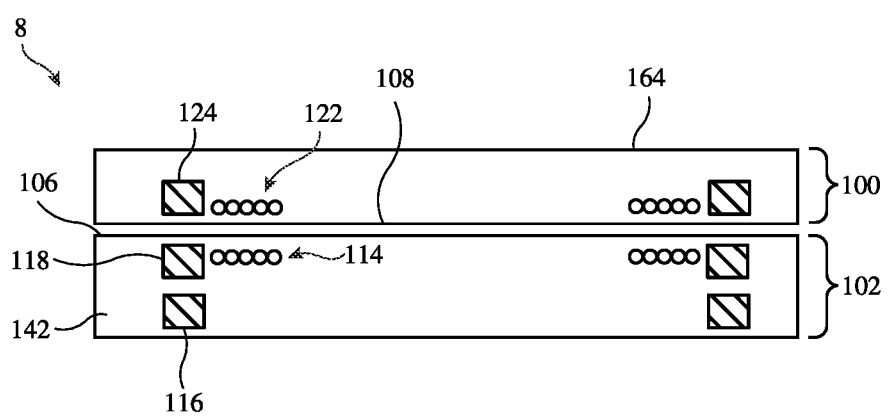
FIG. 4 is a cross-sectional side view of an illustrative wireless power system including an electronic device attached to a removable accessory in accordance with an embodiment.

FIG. 4 is a cross-sectional side view showing device 100 inductively coupled to removable case 102. Device 100 and removable case 102 in FIG. 4 are also physically attached (e.g., the removable case 102 receives device 100). Device 100 may have a housing 164 and a wireless power coil 122 in the housing. Housing 164 may be formed of plastic, glass, ceramics, fiber composites, metal (e.g., stainless steel, aluminum, etc.), other suitable materials, or a combination of any two or more of these materials. Case 102 may have a recess that conforms to the shape of housing 164. In one illustrative example, device 100 is a power transmitting and receiving device (e.g., device 18 in FIG. 1). In general, device 100 may be a removable battery case, a portable electronic device such as a wristwatch, a cellular telephone, a laptop computer, a tablet computer, an accessory such as an earbud, or other electronic equipment. Herein, an example will be described where device 100 is a portable electronic device such as a cellular telephone that is capable of both transmitting and receiving wireless power. Coil 122 in device 100 may either transmit wireless power or receive wireless power at a given time.

Removable case 102 may include one or more dielectric layers 142 (e.g., a bulk dielectric material) such as one or more layers of fabric, leather, polymer (e.g., polyurethane), other materials, and/or combinations of these materials. One or more coils may be embedded in the one or more layers of dielectric material. In general, device 102 may be a removable battery case, a portable electronic device such as a wristwatch, a cellular telephone, a laptop computer, a tablet computer, an accessory such as an earbud, another accessory device (e.g., a case), or other electronic equipment. Herein, an example will be described where device 102 is an accessory device such as a case that is configured to receive wireless power (but does not transmit wireless power).

As shown in FIG. 4, removable case 102 may include a first coil 114. As shown, coil 114 may be adjacent to a first surface 106 of removable case 102. The removable case may be configured such that surface 106 is positioned adjacent to device 100 when removable case 102 is physically coupled to device 100. Consequently, coil 114 may be positioned adjacent to device 100 (and corresponding coil 122) when removable case 102 is physically (and inductively) coupled to device 100. Accordingly, coil 114 may be used to receive wireless power from device 100.

Coil 122 may be capable of transmitting or receiving wireless power signals. When coil 122 is not inductively coupled to an additional coil, coil 122 may be in a standby mode. When coil 122 is on standby (e.g., in a standby mode or standby state), the coil does not continuously transmit or receive wireless power signals. In other words, the standby mode occurs when the coil has not entered a dedicated power transfer phase. While coil 122 is in the standby mode, device 100 may intermittently check for the presence of another device (e.g., using coil 122 or another sensor in the device) adjacent to surface 108. For example, coil 122 may intermittently transmit low power pings while on standby in order to monitor for another device being added to the system. Alternatively or in addition, a magnetic sensor (e.g., a Hall effect sensor), another type of sensor, a near-field communication (NFC) antenna, or another desired component may be used to detect another device adjacent to surface 108 of device 100. The coil 122 may additionally be prepared to send a transmission (e.g., an ASK transmission) while on standby. If coil 122 receives a digital ping from another device in the system, the coil may immediately respond with the transmission.

When device 100 is coupled to device 102, a magnetic sensor or other sensor in device 100 may detect the presence of accessory device 102. The detection of the accessory device by the magnetic sensor may trigger near-field communication between device 100 and device 102. Device 100 may use near-field communication to verify the type of accessory device 102 that is present. In this example, device 100 identifies that device 102 is a power receiving device (e.g., a device that is configured to only receive wireless power). Accordingly, device 100 may enter a power transfer mode where coil 122 transmits wireless power signals.

When coil 122 is used to transmit wireless power to coil 114, inverter circuitry (e.g., inverter 86 in FIG. 1) can drive the coil 122 to generate magnetic flux. Coil 114 in device 102 may be coupled to rectifier circuitry (e.g., rectifier 50 in FIG. 1). The rectifier circuitry converts received AC signals from coil 114 into DC voltage signals for powering device 102 and/or charging a supercapacitor 58 in device 102.

Figure 5:
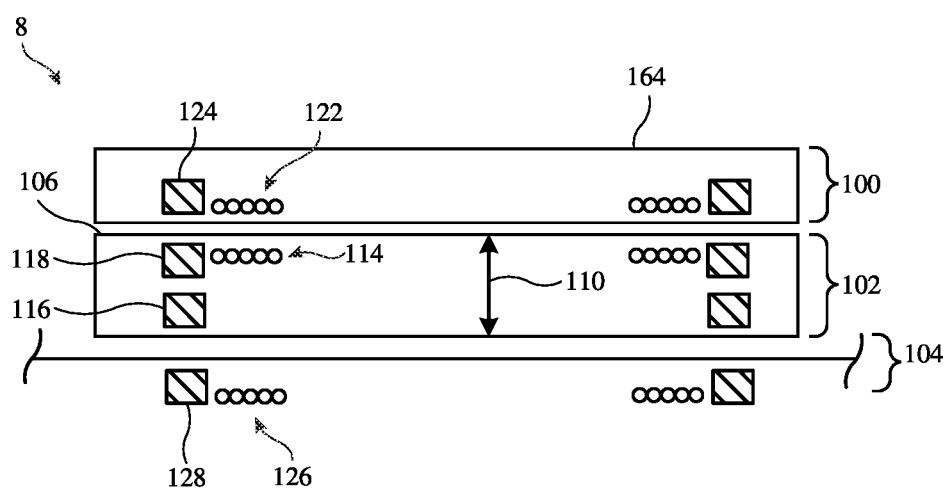
FIG. 5 is a cross-sectional side view of an illustrative wireless power system including an electronic device that is attached to a removable accessory and that is inductively coupled to a power transmitting device in accordance with an embodiment.

In some situations, device 100 and accessory 102 may be physically coupled together and may be placed on a power transmitting device. A situation of this type is shown in FIG. 5. In this scenario, power transmitting device 104 may transmit wireless power to device 100. At the same time, device 102 may siphon some of the transmitted power to also charge its supercapacitor (e.g., device 104 transmits wireless power to both devices 100 and 102).

Similar to as discussed in connection with FIG. 1, the power transmitting device 104 in FIG. 5 may be a wireless charging mat, wireless charging puck, (e.g., a dedicated wireless power transmitting device), or another electronic device (e.g., a wireless power transmitting and receiving device such as a charging case). An example is described herein where the power transmitting device 104 is a wireless charging puck. The wireless charging puck 104 may be connected to a wall outlet (e.g., an alternating current power source). Using power from this power source, the wireless charging puck 104 may transmit wireless power to one or more devices.

In FIG. 5, coil 126 in power transmitting device 104 may transmit wireless power signals to coil 122 in device 100. Inverter circuitry may drive the coil 126 to generate magnetic flux. Coil 122 in device 100 may be coupled to rectifier circuitry (e.g., rectifier 88 in FIG. 1). The rectifier circuitry converts received AC signals from coil 122 into DC voltage signals for powering device 100 and/or charging a battery in device 100.

While coil 126 transmits wireless power signals to coil 122 in device 100, coil 114 in accessory 102 may siphon some of the wireless power signals. In other words, the primary wireless power transfer operation is between coil 126 and coil 122. The power transfer operations may be performed without consideration for the presence of intervening accessory device 102. In other words, the power transmission frequency may be selected by devices 100 and 104 based on information regarding devices 100 and 104. Devices 100 and 104 may not factor in the presence of accessory 102 during initial handshake procedures.

Once devices 100 and 104 enter a power transfer phase, accessory 102 may siphon some of the power transmitted by power transmitting device 104. Accessory device 102 may have a small thickness 110 to maximize the efficiency of power transfer from device 104 to device 100 when accessory device 102 is present. Thickness 110 (e.g., the thickness of the rear wall of the accessory) may be, for example, less than 10 millimeters, less than 8 millimeters, less than 6 millimeters, less than 4 millimeters, less than 3 millimeters, less than 2 millimeters, less than 1 millimeter, between 0.1 millimeter and 5 millimeters, etc.

Figure 6:
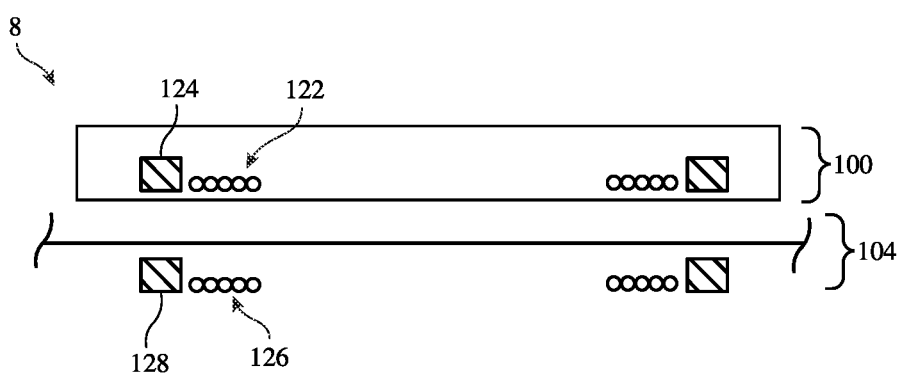
FIG. 6 is a cross-sectional side view of an illustrative wireless power system including an electronic device that is inductively coupled to a wireless power transmitting device without an intervening removable accessory in accordance with an embodiment.

In some scenarios, device 100 may be placed on power transmitting device 104 without an intervening accessory device 102. A situation of this type is shown in FIG. 6. In this scenario, power transmitting device 104 may transmit wireless power to device 100. Notably, the operation of devices 104 and 100 may be unchanged in FIG. 6 relative to FIG. 5. In other words, device 104 transmits wireless power to device 100 in FIG. 6 using the same procedure as in FIG. 5, even though the accessory is present in one scenario (in FIG. 5) and absent in another scenario (in FIG. 6).

Each one of coils 114, 122, and 126 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Devices 100, 102, and 104 may also optionally include magnetic alignment structures. As shown in FIGS. 4-6, device 100 includes a magnetic alignment structure 124. Device 102 includes a first magnetic alignment structure 118 and a second magnetic alignment structure 116. Device 104 includes a magnetic alignment structure 128. Each magnetic alignment structure in the system may magnetically couple with a corresponding magnetic alignment structure in the system. For example, alignment structure 128 in transmitting device 104 may magnetically couple with alignment structure 116 in removable accessory 102. When the alignment structure 128 in device 104 is coupled to the alignment structure 116 in device 102, the coil 126 may be aligned with the coil 114. Therefore, the magnetic alignment structures ensure proper alignment of coil 114 relative to coil 126. When device 100 is placed on transmitter 104 without accessory device 102 present, alignment structure 128 in transmitting device 104 may magnetically couple with alignment structure 124 in device 100. When the alignment structure 128 in device 104 is coupled to the alignment structure 124 in device 100, the coil 126 may be aligned with the coil 122. Therefore, the magnetic alignment structures ensure proper alignment of coil 122 relative to coil 126.

Alignment structure 118 in removable accessory 102 may magnetically couple with alignment structure 124 in device 100. When the alignment structure 118 in device 102 is coupled to the alignment structure 124 in device 100, the coil 114 may be aligned with the coil 122. Therefore, the magnetic alignment structures ensure proper alignment of coil 122 and coil 114.

The example in FIGS. 4 and 5 of device 102 including a first magnetic alignment structure 116 that couples to magnetic alignment structure 128 and a second magnetic alignment structure 118 that couples to magnetic alignment structure 124 is merely illustrative. Instead, device 102 may include a single magnetic alignment structure that magnetically couples to both magnetic alignment structure 128 and magnetic alignment structure 124.

Magnetic alignment structures 128, 116, 118, and 124 may be permanent magnets (e.g., formed from hard magnetic materials that retain their magnetism over time). The magnetic alignment structures may laterally surround a respective coil. The alignment structures may sometimes be described as annular or circular. Magnetic alignment structure 128 may have a central opening with coil 126 formed in the central opening. Alignment structure 128 and coil 126 may be concentric. This example is merely illustrative. Other arrangements may be used if desired. For example, alignment structure 128 may be formed as two discrete permanent magnets on opposing sides of coil 126. In another example, a plurality of discrete permanent magnets may be arranged in a circular (annular) pattern (e.g., dotted lines forming a circle) around coil 126. The discrete permanent magnets may have an arcuate arrangement. The aforementioned magnetic alignment structure and coil arrangements described relative to alignment structure 128 and coil 126 may apply to any of the sets of alignment structures and coils (e.g., alignment structure 116 and coil 114, alignment structure 118 and coil 114, and alignment structure 124 and coil 122).

Each coil (e.g., coils 114, 122, and 126) may optionally have a corresponding magnetic core of any desired design. In one possible arrangement, a magnetic core may be included with a pot-core design (e.g., an enclosure with a ring-shaped hollow portion that receives the coil). In yet another possible arrangement, a winding on a bar-shaped ferrite may be used. Any desired magnetic core and coil design may be used (e.g., a U-shaped core, a C-shaped core, an E-shaped core, a toroidal core, etc.). Each coil may have any desired number of windings. The precise geometry of the coils and magnetic cores in devices 100, 102, and 104 may be tailored to the specific design. Device 100 may be designed to cooperate specifically with wireless power transmitting device 104. This is, however, merely illustrative. Device 100 may, in comes cases, not be specifically designed to cooperate with power transmitting device 104. In general, each device may have different coil arrangements, different (or no) magnetic elements (e.g., magnetic cores), different coil and magnetic element sizes, different coil and magnetic element shapes, and other different characteristics.

Figure 7:
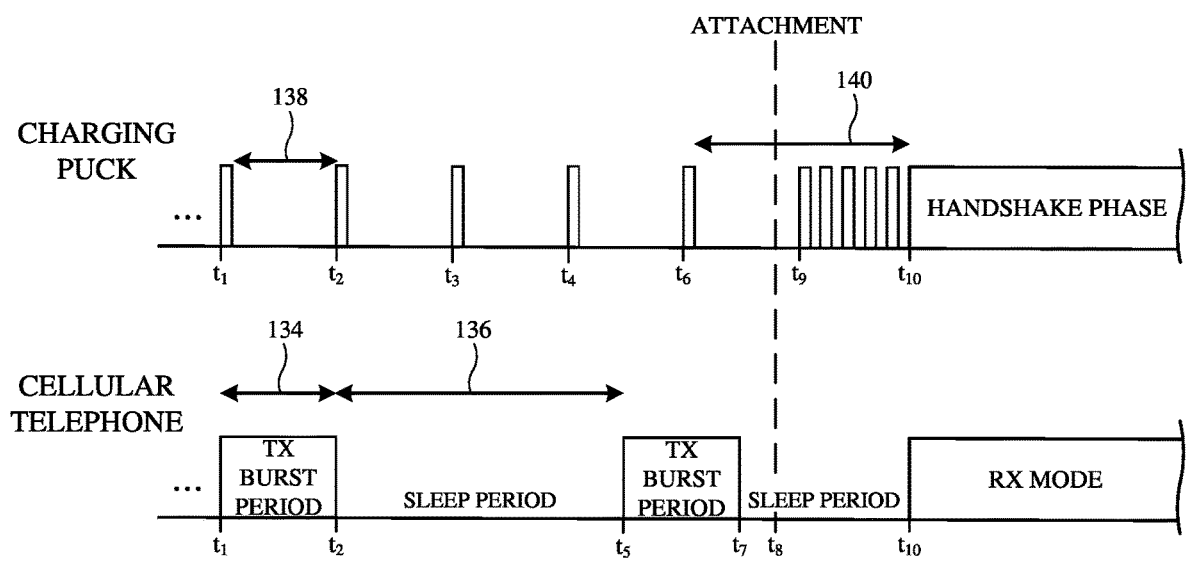
FIG. 7 is a timing diagram showing illustrative operations of a charging puck and a cellular telephone in accordance with an embodiment.

FIG. 7 is a timeline showing the operations of device 100 (e.g., a cellular telephone) and device 104 (e.g., a charging puck) when the cellular telephone is placed on the charging puck. In the example of FIG. 7, before $t_1$, the cellular telephone may be attached (e.g., physically and inductively coupled) to an accessory device such as accessory device 102. In this example, coil 122 of device 100 is in a power transmitting mode and transmits wireless power to coil 114 in accessory device 102.

When device 100 and an attached removable accessory 102 are placed on charging puck 104, it is desirable for device 100 (and accessory device 102) to obtain wireless power from puck 104. However, while device 100 is transmitting wireless power to accessory device 102, a technique is needed for device 100 to detect the presence of charging puck 104. In some embodiments, to allow device 100 to transfer sufficient wireless power to accessory 102 while still ensuring device 100 is capable of detecting attachment to device 104, device 100 transmits alternating-current wireless power signals in bursts.

As shown in FIG. 7, the cellular telephone 100 transmits wireless power in a transmitting burst period between $t_1$ and $t_2$. Between $t_1$ and $t_2$, inverter circuitry (e.g., inverter 86 in FIG. 1) can drive the coil 122 in device 100 to generate alternating-current wireless power signals (e.g., at a frequency between 100 kHz and 400 kHz). The cellular telephone 100 ceases transmitting the alternating-current wireless power signals at $t_2$ and enters a sleep period between $t_2$ and $t_5$. Between $t_2$ and $t_3$, coil 122 is in a sleep period (sometimes referred to as standby period) during which the coil does not transmit alternating-current wireless power signals. While in the sleep period, device 100 may monitor for communications from/the presence of charging puck 104 (e.g., using coil 122 and/or additional sensors/components in device 100).

While attached to the accessory 102 (and not charging puck 104), cellular telephone 100 may continuously cycle (alternate) between the power transmitting burst periods (in which the coil transmits AC wireless power signals) and the sleep periods (in which the coil does not transmit AC wireless power signals). Before $t_1$ in FIG. 7, cellular telephone 100 may have repeatedly switched between power transmitting burst periods and sleep periods. As shown in FIG. 7, after the sleep period concludes at $t^5$, another power transmitting burst period occurs between $t_5$ and $t_7$. At $t_7$, the cellular telephone switches back to a sleep period.

The duration 134 of the burst period may be less than the duration 136 of the sleep period in each cycle. In general, durations 134 and 136 may have any desired magnitudes. Duration 134 may be less than 300 milliseconds, less than 200 milliseconds, less than 100 milliseconds, less than 50 milliseconds, greater than 300 milliseconds, greater than 200 milliseconds, greater than 100 milliseconds, greater than 50 milliseconds, etc. Duration 136 may be less than 1000 milliseconds, less than 500 milliseconds, less than 300 milliseconds, less than 200 milliseconds, less than 100 milliseconds, less than 50 milliseconds, greater than 1000 milliseconds, greater than 500 milliseconds, greater than 300 milliseconds, greater than 200 milliseconds, greater than 100 milliseconds, greater than 50 milliseconds, etc.

The magnitude of duration 134 relative to the total time of the cycle (e.g., the sum of magnitudes 134 and 136) may be referred to as the duty cycle of the wireless power transmitting mode (e.g., the percentage of time AC signals are transmitted in each cycle). The duty cycle may be less than 100%, less than 80%, less than 60%, less than 40%, less than 20%, less than 10%, greater than 60%, greater than 40%, greater than 20%, greater than 10%, greater than 5%, etc.

It should be understood that, during each burst period, the coil transmits alternating-current wireless power signals that also have a respective duty cycle. The duty cycle of the transmitted AC wireless power signals may be less than 90%, less than 75%, less than 50%, less than 30%, greater than 10%, greater than 30%, greater than 50%, etc.

The magnitudes of durations 134 and 136 may be tuned based on the conditions within the wireless power system. In particular, if the accessory device has a higher load (and therefore consumes more power), duration 134 may be higher and if the accessory device has a lower load (and therefore consumes less power), duration 134 may be lower. Similarly, the duration 136 may be increased if the accessory device has a lower load and decreased in the accessory device has a higher load.

Before $t_8$, the cellular telephone and mated accessory device are not attached to the charging puck. During this time, charging puck 104 intermittently transmits low power pings (sometimes referred to as analog pings) in order to monitor for the presence of a device on the charging puck. During each low power ping, a test pulse is applied to the transmitter coil 126. The voltage of coil 126 may be monitored when the test pulse is applied to transmitter coil 126. A deviation in coil voltage from a nominal standby value may indicated a device is present on charging puck 104.

As shown in FIG. 7, charging puck 104 may emit a low power ping at $t_1$, $t_2$, $t_3$, $t_4$, and $t_6$. The charging puck does not detect any placed objects during this time period (e.g., before $t_8$) and therefore emits the low power pings at a regular interval. The interval 138 between each low power ping may be less than 5 seconds, less than 1000 milliseconds, less than 500 milliseconds, less than 300 milliseconds, less than 200 milliseconds, less than 100 milliseconds, less than 50 milliseconds, greater than 1000 milliseconds, greater than 500 milliseconds, greater than 300 milliseconds, greater than 200 milliseconds, greater than 100 milliseconds, greater than 50 milliseconds, etc.

At $t_8$, cellular telephone 100 (with mated accessory device 102) is placed on charging puck 104, and it is desirable for cellular telephone 100 to switch from the power transmitting mode to a power receiving mode. After attachment between the charging puck and the cellular telephone (and mated accessory device), charging puck 104 transmits a low power ping at $t_9$ according to the regular interval 138. Because the cellular telephone is present on the charging puck, charging puck 104 may detect the presence of an object on the mat during the low power ping. To verify the presence of an object on the mat, charging puck may transmit additional low power pings between $t_9$ and $t_{10}$. After the charging puck is confident that a device capable of receiving wireless power has been placed on the charging puck, the charging puck enters a handshake phase at $t_{10}$. During the handshake phase, the devices negotiate a frequency and/or rate of power delivery. After the handshake phase (and associated power delivery negotiation) is complete, the devices enter a dedicated power delivery phase using the agreed upon power delivery parameters.

During the handshake phase, low-level wireless power signals may be transmitted from the wireless power transmitting device (e.g., digital ping operations may be performed). During the handshake phase, sufficient power is supplied to power communications circuitry in the wireless power receiving device. The wireless power signals provided during the handshake phase (e.g., digital pings) may include longer pulses than the analog pings at $t_1$, $t_2$, $t_3$, etc. Additionally, the wireless power signals in the handshake phase provide sufficient power to activate the power receiving device 100 (if one is indeed present). By powering the control circuitry and its associated communications circuitry in device 104, devices 100 and 104 can subsequently negotiate over a wireless link (e.g., an in-band link) to determine an appropriate wireless power transfer level for system 8 to use during subsequent wireless power transfer operations (e.g., a significantly larger power such as 5 W, 10 W, or other relatively large value associated with normal wireless power transmission operations, which is generally at least 5 times, at least 10 times, or at least 25 times greater than the power used during the handshake phase).

Also at $t_{10}$, upon initiation of the handshake phase by charging puck 104, cellular telephone 100 enters a wireless power receiving mode. Cellular telephone 100 stops transmitting wireless power to the accessory device and instead receives wireless power from the charging puck.

The magnitude of durations 136 and 138 may be selected to ensure that the sleep periods of the cellular telephone is sufficiently long to guarantee overlap with a low power ping and subsequent initiation of handshake proceedings from the charging puck 104. In other words, there is a duration 140 between the last low power ping (at $t_6$) before attachment (at $t_8$) and the initiation of the handshake procedure at $t_{10}$ after the charging puck is attached to the cellular telephone and detects the presence of a device. To ensure that cellular telephone 100 is in a sleep period when the handshake phase commences (and, therefore, the cellular telephone is capable of communicating in order to negotiate power transfer parameters), duration 140 may be shorter than duration 136 of the sleep period. This prevents a scenario where cellular telephone does not detect the handshake initiation at $t_{10}$ and undesirably stays in the power transmitting mode (even though the cellular telephone is on a wireless charging puck). Duration 138 may also be shorter than duration 136.

Although not explicitly shown in FIG. 7, the accessory device may remain in a wireless power receiving mode throughout the operations of FIG. 7. Before the cellular telephone is placed on the charging puck, the accessory device is attached to the cellular telephone and receives wireless power from the cellular phone during the power transmission bursts (e.g., between $t_1$ and $t_2$ and between $t_5$ and $t_7$). While the cellular telephone is in the sleep periods, the accessory device does not receive wireless power from the cellular telephone and instead uses stored power (e.g., from a supercapacitor) to operate. After the cellular telephone (and mated accessory) are placed on the charging puck, the cellular telephone switches to a power receiving mode and receives wireless power from the charging puck. The accessory device remains in the receiving mode throughout this process. When the charging puck delivers wireless power to the cellular telephone, the accessory device may siphon some of the wireless power and use the siphoned power to operate and/or charge a power storage device in the accessory.

Notably, the operations of charging puck 104 are not impacted by the presence of accessory device 102. In other words, the timeline in FIG. 7 for charging puck 104 is the same whether a cellular telephone and mated (intervening) accessory are attached to the charging puck or only a cellular telephone (without a mated accessory) is attached to the charging puck.

Figure 8:
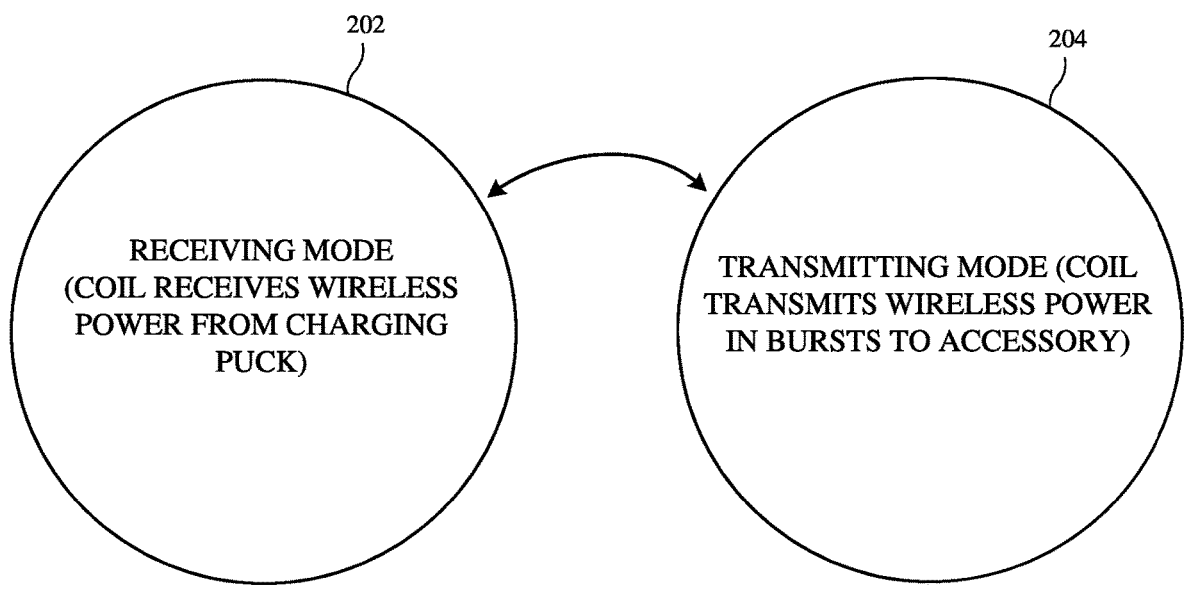
FIG. 8 is a state diagram of illustrative modes of operation for an electronic device in a wireless power system in accordance with an embodiment.

FIG. 8 is a state diagram showing illustrative modes of operation for device 100 in system 8. Device 100 may be operable in a receiving mode 202 in which coil 122 receives wireless power (e.g., from coil 126 in power transmitting device 104, from a coil in a removable accessory, etc.). In the receiving mode, rectifier circuitry in device 100 converts received AC signals from coil 122 into DC voltage signals for powering device 100 and/or charging a battery in device 100.

Device 100 may operate in the receiving mode while device 100 is inductively coupled to power transmitting device 104. In some arrangements, device 100 may operate in the receiving mode while inductively coupled to an accessory device that is capable of transmitting wireless power. For example, device 100 may be inductively coupled to a battery case that includes a battery and a wireless power coil. Device 100 may receive wireless power from the battery case while inductively coupled to the battery case.

Device 100 may also be operable in a transmitting mode 204 in which coil 122 transmits wireless power. Device 100 may transmit wireless power to an accessory device such as accessory device 102. In the transmitting mode, inverter circuitry 86 (e.g., formed from transistors) coupled to coil 122 may be turned on and off based on control signals provided by control circuitry 78 to create AC current signals through coil 122. These coil drive signals cause coil 122 to transmit wireless power to coil 114 in device 102.

In the transmitting mode, device 100 may transmit wireless power in bursts that are separated by sleep periods where wireless power is not transmitted. During the wireless power transmission bursts, inverter circuitry 86 (e.g., formed from transistors) coupled to coil 122 may be turned on and off based on control signals provided by control circuitry 78 to create AC current signals through coil 122. During the sleep periods between bursts, device 100 does not transmit AC wireless power signals and monitors for digital pings from a power transmitting device such as charging puck 104.

Device 100 may operate in the transmitting mode while device 100 is inductively coupled to removable accessory 102 (that is a dedicated power receiving device). In some cases, device 100 may be coupled to an accessory that is a wireless power transmitting and receiving device (such as a battery pack). Device 100 may also operate in the transmitting mode (and transmit wireless power to the battery pack) while device 100 is tethered to mains power through a power cable and a voltage converter such as an AC to USB adapter.

Device 100 may switch from the receiving mode to the transmitting mode in response to the cellular telephone (and a mated accessory device) being removed from a power transmitting device.

If the state of charge of the removable accessory 102 is very low and the state of charge of device 100 is very high, device 100 may operate in the transmitting mode 204. Devices 100 and 102 may exchange state of charge information and switch device 100 into the transmitting mode (and device 102 into its receiving mode) if appropriate. As another example, a user may manually switch the mode of device 100 while device is inductively coupled to removable accessory 102.

Figure 9:
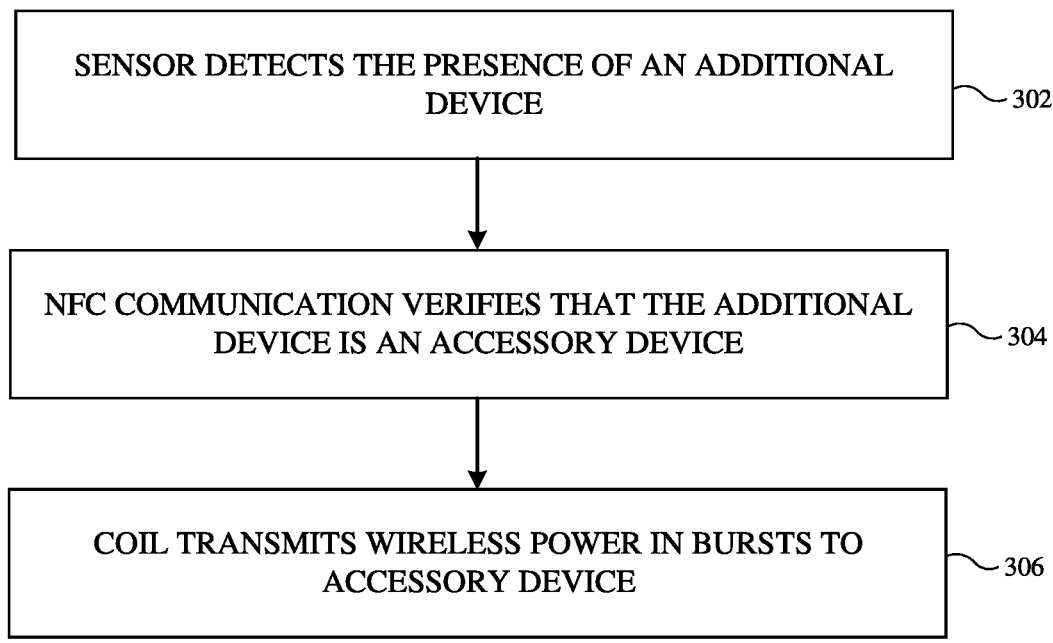
FIG. 9 is a flowchart of illustrative operations performed by an electronic device in response to being attached to a removable accessory in accordance with an embodiment.

FIG. 9 is a flowchart of illustrative operations performed by a cellular telephone in a wireless power system. As shown in FIG. 9, the cellular telephone (e.g., device 100) may detect the presence of an additional device at step 302. To detect the additional device, the cellular telephone may use a sensor that is sensitive to electromagnetism such as a Hall effect sensor (a sensor that measures the magnitude of a magnetic field). This example is merely illustrative. An accelerometer (e.g., that detects when the cellular telephone bumps into an additional device) or the wireless power coil itself (e.g., coil 122 that is also used to transmit or receive wireless power) may be used to detect the presence of an additional device. In general, input from any subset (e.g., one or more) of the input-output components in device 100 may be used to detect the presence of the additional device.

Once the additional device is detected, cellular telephone 100 may optionally initiate an NFC scan during step 304. NFC communication may be used to identify the device type of the additional device (e.g., a removable accessory that only receives wireless power, a removable accessory that transmits or receives wireless power, etc.) and/or obtain other information from the additional device.

In response to determining that the additional device is an accessory device 102 that only receives wireless power, cellular telephone 100 may enter a power transmitting mode in step 306. In the power transmitting mode, coil 122 transmits wireless power in bursts to the accessory device. Also at step 306, out-of-band communications (e.g., Bluetooth communications using antennas formed separately from coils 114 and 122) may be initiated between cellular telephone 100 and accessory device 102. Cellular telephone 100 may continue to transmit wireless power to the accessory device while the cellular telephone is attached to the accessory device.

Figure 10:
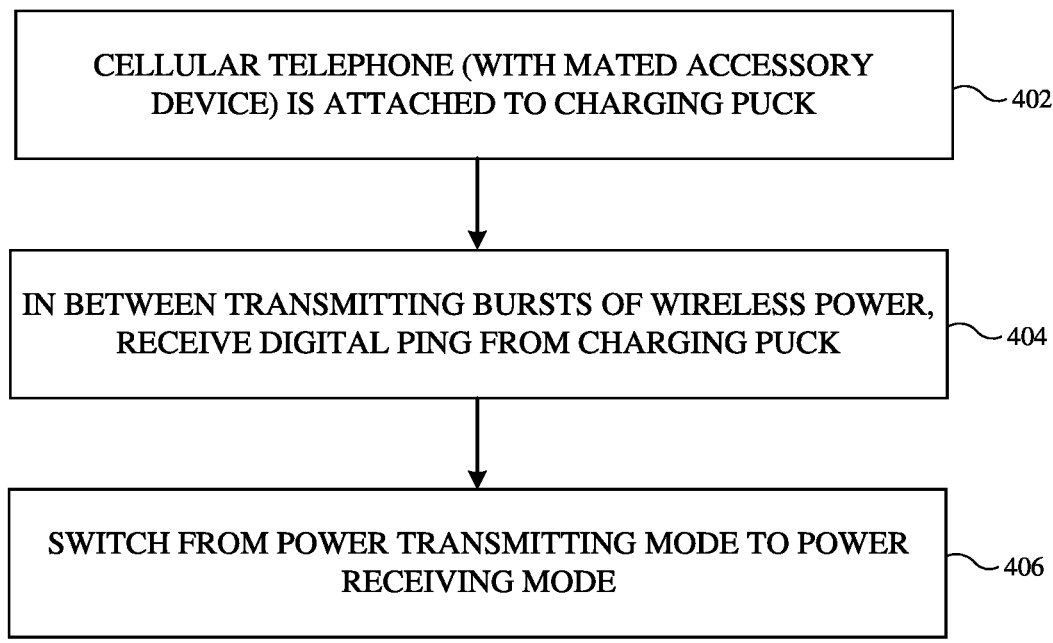
FIG. 10 is a flowchart of illustrative operations performed by an electronic device in response to being placed on a power transmitting mat while attached to a removable accessory in accordance with an embodiment.

FIG. 10 is a flowchart of illustrative operations performed by a cellular telephone in a wireless power system when the cellular telephone switches from a power transmitting mode to a power receiving mode. At the beginning of step 402, the cellular telephone 100 is physically attached and inductively coupled to accessory device 102 (e.g., as described at the end of step 306 in FIG. 9). Cellular telephone 100 is in a power transmitting mode (e.g., mode 204 in FIG. 8) in which wireless power is transmitted in bursts to the accessory device. During step 402, the cellular telephone is attached to a wireless power transmitting device such as charging puck 104.

Next, at step 404, the cellular telephone receives a digital ping from the wireless power transmitting device. The cellular telephone may receive the digital ping while the cellular telephone is in a sleep period between power transmission bursts (as shown and discussed in connection with FIG. 7). Accordingly, the cellular telephone is capable of detecting the digital ping and entering a handshake procedure with the power transmitting device. In response to detecting the digital ping, the cellular telephone switches from the power transmitting mode to the power receiving mode at step 406. In the power receiving mode, the cellular telephone concludes handshake procedures with the power transmitting device and commences a power transfer phase where the cellular telephone receives wireless power from the power transmitting device.

While the cellular telephone and accessory device are present on the charging puck, the cellular telephone may receive wireless power form the charging puck. The accessory device may also receive wireless power from the charging puck (e.g., by siphoning power transmitted from the charging puck). At some subsequent point, the cellular telephone may detect a drop in rectifier voltage indicating that the cellular telephone (and mated accessory device) has been removed from the charging puck. In response to determining that the cellular telephone (and mated accessory device) has been removed from the charging puck, the cellular telephone may revert back to the power transmitting mode and transmit bursts of wireless power to the accessory device.

In another scenario, the cellular telephone may become fully charged and thereafter cease receiving wireless power from the power transmitting device 104 (even though the cellular telephone is still present on the power transmitting device). However, in some scenarios, the cellular telephone may be fully charged before accessory device 102 or accessory device 102 may lose charge faster than the cellular telephone. This may result in accessory device 102 having an undesirably low charge (because it is not receiving any wireless power due to cellular telephone 100 not requiring power from charging puck 104). To prevent this type of scenario and ensure accessory device 102 has sufficient charge, cellular telephone 100 (which knows it is mated to accessory device 102) may negotiate a short duration between low power pings from charging puck 104.

Even if cellular telephone 100 is fully charged and does not need dedicated power transfer from charging puck 104, charging puck 104 may intermittently transmit low power pings to cellular telephone to determine if cellular telephone 100 needs to resume power transfer operations. If the duration between these pings is short, the pings may provide sufficient power to charge accessory device 102 (which siphons some of the power from the low power pings). The low power pings from charging puck 104 emulate the transmitting bursts used by cellular telephone 100 when charging accessory 102.

The foregoing is merely illustrative and various modifications can be made to the described embodiments. The foregoing embodiments may be implemented individually or in any combination.

What is claimed is:

1. An electronic device operable in a wireless charging system with an additional electronic device and a power transmitting device, the electronic device comprising:
   wireless power circuitry including a coil; and
   control circuitry configured to:
   detect a first attachment to the additional electronic device;
   in accordance with detecting the first attachment, enter a power transmitting mode that includes alternating first periods and second periods, wherein the coil transmits alternating-current wireless power signals to the additional electronic device in the first periods, and wherein the coil does not transmit alternating-current wireless power signals to the additional electronic device in the second periods;
   during one of the second periods, detect a second attachment to the power transmitting device; and
   in accordance with detecting the second attachment, switch from the power transmitting mode to a power receiving mode in which the coil receives wireless power signals from the power transmitting device.

2. The electronic device of claim 1, wherein detecting the second attachment comprises receiving a digital ping from the power transmitting device.

3. The electronic device of claim 1, wherein each one of the first periods has a first duration and wherein each one of the second periods has a second duration that is greater than the first duration.

4. The electronic device of claim 1, wherein the control circuitry is further configured to:
   switch from the power receiving mode to the power transmitting mode in response to being removed from a charging surface of the power transmitting device.

5. The electronic device of claim 1, wherein the additional electronic device has an additional coil that is interposed between the power transmitting device and the coil when the electronic device has the first and second attachments.

6. The electronic device of claim 5, wherein the additional coil is configured to siphon some of the wireless power signals from the power transmitting device when the electronic device has the first and second attachments.

7. The electronic device of claim 1, further comprising:
   a sensor that is sensitive to electromagnetism, wherein detecting the first attachment comprises detecting the presence of the additional electronic device using the sensor.

8. The electronic device of claim 1, further comprising:
   a first magnetic alignment structure that is configured to magnetically couple to a second magnetic alignment structure in the additional electronic device when the electronic device has the first attachment.

9. The electronic device of claim 8, wherein the first magnetic alignment structure and the coil are concentric.

10. The electronic device of claim 8, wherein the first magnetic alignment structure is configured to magnetically couple to a third magnetic alignment structure in the power transmitting device when the electronic device has the second attachment.

11. The electronic device of claim 1, wherein the additional electronic device has at least one dielectric layer that forms a planar surface and wherein the planar surface is configured to abut a rear face of the electronic device while the additional electronic device is attached to the electronic device.

12. The electronic device of claim 1, wherein the additional electronic device is a case having a rear wall and peripheral sidewalls that define a recess configured to receive the electronic device.

13. The electronic device of claim 1, wherein each one of the second periods has a duration that is greater than 50 milliseconds.

14. The electronic device of claim 13, wherein the alternating-current wireless power signals transmitted by the coil have a frequency between 100 kHz and 400 kHz.

15. A non-transitory computer-readable storage medium storing one or more programs configured to be executed by one or more processors of an electronic device operable in a wireless charging system with an additional electronic device and a power transmitting device, wherein the electronic device comprises wireless power circuitry including a coil, the one or more programs including instructions for:

detecting a first attachment to the additional electronic device;

in accordance with detecting the first attachment, entering a power transmitting mode that includes alternating first periods and second periods, wherein the coil transmits alternating-current wireless power signals to the additional electronic device in the first periods, and wherein the coil does not transmit alternating-current wireless power signals to the additional electronic device in the second periods;

during one of the second periods, detecting a second attachment to the power transmitting device; and in accordance with detecting the second attachment, switching from the power transmitting mode to a power receiving mode in which the coil receives wireless power signals from the power transmitting device.

16. The non-transitory computer-readable storage medium of claim 15, wherein detecting the second attachment comprises receiving a digital ping from the power transmitting device.

17. The non-transitory computer-readable storage medium of claim 15, wherein the one or more programs further include instructions for:

switching from the power receiving mode to the power transmitting mode in response to being removed from a charging surface of the power transmitting device.

18. A method of operating an electronic device in a wireless charging system with an additional electronic device and a power transmitting device, wherein the electronic device comprises wireless power circuitry including a coil, the method comprising:

detecting a first attachment to the additional electronic device;

in accordance with detecting the first attachment, entering a power transmitting mode that includes alternating first periods and second periods, wherein the coil transmits alternating-current wireless power signals to the additional electronic device in the first periods, and wherein the coil does not transmit alternating-current wireless power signals to the additional electronic device in the second periods;

during one of the second periods, detecting a second attachment to the power transmitting device; and in accordance with detecting the second attachment, switching from the power transmitting mode to a power receiving mode in which the coil receives wireless power signals from the power transmitting device.

19. The method of claim 18, wherein detecting the second attachment comprises receiving a digital ping from the power transmitting device.

20. The method of claim 18, further comprising:

switching from the power receiving mode to the power transmitting mode in response to being removed from a charging surface of the power transmitting device.

* * * * *